Feb. 14, 1956    E. W. TODD    2,734,438
HITCH LINK
Filed Dec. 17, 1952
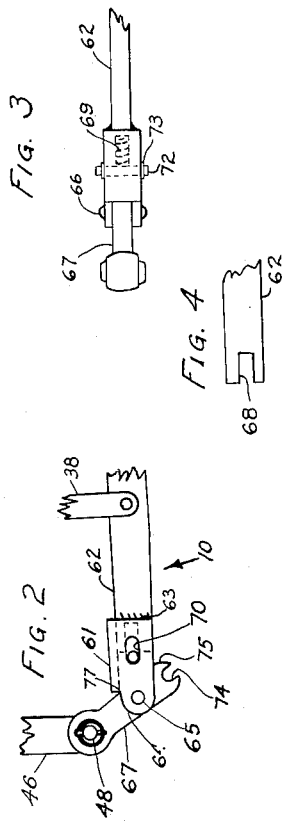
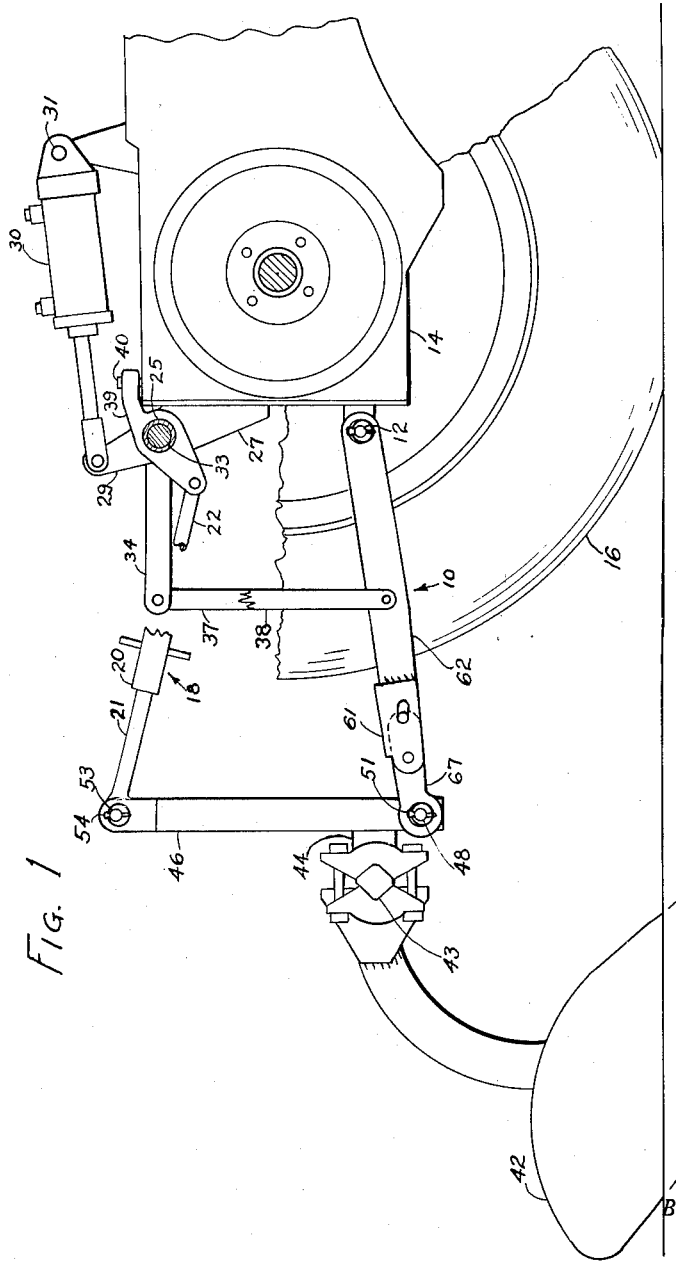
INVENTOR.
EVERETT W. TODD
BY James E. Nilles
ATT'Y

United States Patent Office 2,734,438
Patented Feb. 14, 1956

2,734,438

HITCH LINK

Everett W. Todd, Racine, Wis., assignor to Massey-Harris-Ferguson Inc., a corporation of Maryland Application December 17, 1952, Serial No. 326,422

7 Claims. (Cl. 97—47.14)

This invention relates to a hitch for coupling an implement to a prime mover. It finds particular utility in what is commonly referred to as a three point linkage wherein the implement is mounted directly on, and carried by, the tractor.

In hitches of this type, especially where the implement to be attached is of considerable weight, it is a difficult and time consuming task to couple the implement to the tractor, usually requiring two men. For instance, the tractor must first be positioned carefully in respect to the implement to be attached, the free end of the hitch links being brought into close alignment with the connecting pins on the implement. However, it is often impossible for the tractor operator to so align the links and it is often necessary for him to get on and off the tractor repeatedly to adjust the implement relative to the links, the entire process usually attended by skinned and bruised fingers.

It is an object of this invention to provide an improved hitch for connecting an implement to a prime mover.

It is an object of this invention to provide an improved hitch link which has a collapsible joint intermediate its length which is readily attachable to the implement.

It is an object of this invention to provide an improved hitch link which has a collapsible joint intermediate its length to facilitate the connection of the implement to the tractor and which will automatically assume a locked, rigid position when the hitch is raised slightly or the tractor moved forwardly.

Figure 1 is a right side elevational view of an embodiment of my invention with the right tractor wheel removed and a cross section taken through the power lift shaft near the center portion thereof.

Figure 2 is a fragmentary view of my novel link in the collapsed position.

Figure 3 is a top plan view of my novel link in the locked position.

Figure 4 shows the rear end of the front arm of the hitch link.

The embodiment I have shown is in a three point linkage which is well known in the art and which comprises two lower, laterally spaced, rearwardly extending hitch links 10 which are pivotally connected by quick detaching pins 12 to the rear end of a tractor housing 14 which is carried by the rear tractor wheels 16. The third point of connection comprises a compression member 18 which is adjustable in length by means of a threaded sleeve 20 which threadably engages members 21, 22 of the upper link 18.

To raise and lower the hitch, a sleeve 25 is rotatably mounted in two laterally spaced brackets 27 which are bolted, or otherwise secured, to the rear end of the tractor housing 14. Welded to the center part of the sleeve is an upwardly extending arm 29 which is oscillated by the two-way servo-motor 30 pivotally mounted to the top of the tractor housing as at 31. Within the sleeve 25 is rotatably mounted a shaft 33 on which is rotatably mounted two laterally spaced lift arms 34. Between the lift arms 34 and the lever 29 is a lost motion connection (not shown) which allows the plow to rise and fall freely when in the working position. Each of the laterally spaced lift arms 34 (only one shown) is pivotally connected to its corresponding hitch link 10 by means of lift straps 37, 38 respectively, for purposes of leveling the implement. The upper link 18 is pivotally connected to a bracket 39, which in turn is rigidly secured to the tractor housing by means of a bolt 40, and in which rotates the sleeve 25.

The implement I have shown is a single bottom plow 42 which is clamped by conventional means to the laterally extending tool bar 43. The tool bar 43 is rigidly secured by means of bracket members 44 to a conventional upstanding A frame 46 having laterally projecting pins 48 at either side for the universal connection to the ball and socket joints at the rear end of hitch links 10. A quick detachable pin 51 retains the hitch link on the projecting pin 48. At the rear end of the upper compression link 18 is another ball and socket joint which is pivotally connected to a pin 53 carried in the aligned holes in the upper end of the A frame 46. The pin 53 is also held in place by a quick detachable keeper pin 54.

The link 10 is shown in Figure 2 in the collapsed position, and comprises a front arm 62 and rear arm 67 which are pivotally connected together. An inverted U-shaped member 61 is welded to the front arm 62 of the hitch link 10 as at 63. The U-shaped member 61 has two rearwardly projecting portions 64 having transversely aligned holes 65. Pivotally mounted between these projections by means of a pin 66, is the rear arm 67 of the hitch link 10.

In Figure 4 is shown the rear end of the front arm 62 which has a slot 68 therein for the reception of a compression spring 69. The U-shaped member 61 has transversely aligned slots 70 in either side portion thereof. Slidably mounted in these slots is a pin 72 which is held in the slots by means of snap rings 73. Referring again to Figure 2, the forward end of the rear arm 67 has a slot 74 therein for the reception of pin 72 which is normally urged into the engaging position by means of the compression spring 69. The forward end of the rear arm 67 is rounded as at 75 to facilitate the movement of pin 72 and its engagement with slot 74. The spring 69 is of sufficient strength to firmly hold the pin 72 in the locked position but is not strong enough to prevent disengagement by simply pushing the pin 72 forwardly.

With this invention it is not necessary for the tractor operator to be so particular in aligning the rearward end of the hitch links with the projecting pins on the implement frame. In the conventional hitch there is, of course, a certain amount of freedom of the rear end of the link 10 in a lateral and vertical direction. However, there is absolutely no flexibility in a rearward or forward direction. It can now be seen that, with my improved link, I have provided a very flexible and readily adjustable link which facilitates the connection of the link to the implement frame without adjusting and positioning the implement frame or repeatedly altering the position of the tractor. The top side of the U-shaped member 61 acts as a stop and prevents the rear arm 67 from swinging too far upwardly, i. e., the two arms 67 and 62 are held in alignment while the pin 72 snaps into slot 74. Furthermore the corner 77 of the top side of member 61 prevents the pivot point 65 from going over center when in the collapsed position and thus insures a quick and positive locking action when the hitch is moved by the power lift, or the tractor moved forwardly. After the operator has made the connection and replaced the quick detachable pins 48, he can readily adjust the top link for length and if necessary raise the hitch links 10 with the power lift in order to align the upper link with its connecting part on the implement. After the lower link connection is made the joint will snap into its rigid, operating position when the hitch is raised slightly by the power lift means or the tractor driven ahead slightly without requiring further attention on the part of the operator.

It should be understood that it is not intended to limit the invention to the exact details of construction or arrangement herein shown and described, for purposes of illustration, as various modifications within the scope of the appended claims may occur to persons skilled in the art.

Having thus shown and described my invention, I claim:

1. In a hitch for coupling an implement to a prime mover comprising; two laterally spaced, lower hitch links pivotally connecting the implement to the tractor, power lift means for vertically positioning said links, the improvement comprising a collapsible joint in each of said lower links and spring actuated means for automatically releasably locking said joint in a rigid position when the latter is aligned.

2. A hitch link for connecting an implement to a tractor comprising; a front arm, an inverted U-shaped member secured to the rear end of said front arm, a rear arm pivotally secured to said U-shaped member, spring actuated means for automatically releasably locking said arms in a rigid operating position when the latter are in alignment.

3. A hitch link for connecting an implement to a tractor comprising; a front arm, a rear arm pivotally connected to said front arm, power lift means for raising said arms, stop means carried by one arm for holding said arms in alignment when the latter are raised and adapted to limit the extent of non-alignment, resiliently urged releasable latch means for automatically locking said arms in a rigid position relative to each other when said arms are raised.

4. A hitch link for connecting an implement to a tractor comprising; a rear arm; a front arm; an inverted U-shaped member rigidly secured to one of said arms and pivotally attached to the other said arm, said U-shaped member including a stop portion for holding said arms in alignment when raised and for limiting the extent of non-alignment, spring actuated releasable latch means between said arms for rigidly holding said arms in alignment.

5. A hitch link for connecting an implement to a tractor comprising, a front arm, a rear arm, an inverted U-shaped member rigidly secured to one of said arms and pivotally attached to the other of said arms, for holding said arms in alignment when raised and limiting the extent of non-alignment of said arms when the link is in the collapsed position, resiliently urged releasable latch means between said U-shaped member and the said other arm.

6. In a hitch for connecting an implement to a tractor to be elevationally positioned and supported thereby of the type having two laterally spaced lower hitch links and an upper tension member, said lower hitch links each comprising; a first arm having an open slot at one end thereof and an inclined top portion above said slot, a second arm having an inverted U-shaped member secured thereto and extending therefrom at one end thereof, a pivotal connection between said first arm and said member, said member having a stop portion for holding said arms in alignment when raised and preventing excessive non-alignment when in the collapsed position, spring actuated latch means in said member adapted to be received by said slot in manually releasable engagement therewith when said arms are in alignment.

7. In a hitch for coupling an implement to a prime mover comprising; two laterally spaced, lower hitch links pivotally connecting the implement to the tractor, power lift means for vertically positioning said links, the improvement comprising a collapsible joint in each of said lower links and resiliently urged means for automatically releasably locking said joint in a rigid position when the latter is aligned.

References Cited in the file of this patent

UNITED STATES PATENTS

| | | |
|---|---|---|
| 2,346,757 | Horner | Apr. 18, 1944 |
| 2,359,121 | Kinnan | Sept. 26, 1944 |
| 2,415,968 | Price | Feb. 18, 1947 |
| 2,493,261 | Porter et al. | Jan. 3, 1950 |
| 2,683,403 | Flentie | July 13, 1954 |